US008185397B2

(12) United States Patent
Lee et al.

(10) Patent No.: US 8,185,397 B2
(45) Date of Patent: May 22, 2012

(54) SPEECH PROCESSING APPARATUS, MEDIUM, AND METHOD RECOGNIZING AND RESPONDING TO SPEECH USING ENTITY INFORMATION

(75) Inventors: Jaewon Lee, Seoul (KR); Inho Kang, Yongin-si (KR); Haechang Rim, Seoul (KR); Jeongsu Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1045 days.

(21) Appl. No.: 11/377,207

(22) Filed: Mar. 17, 2006

(65) Prior Publication Data
US 2006/0224383 A1 Oct. 5, 2006

(30) Foreign Application Priority Data
Mar. 29, 2005 (KR) ......................... 10-2005-0025975

(51) Int. Cl.
*G06F 17/27* (2006.01)
*G10L 15/06* (2006.01)
*G10L 21/00* (2006.01)
(52) U.S. Cl. ......... 704/270; 704/9; 704/243; 704/270.1; 704/275
(58) Field of Classification Search .................. 704/243, 704/270, 270.1
See application file for complete search history.

(56) References Cited

U.S. PATENT DOCUMENTS
5,386,556 A  1/1995  Hedin et al.
6,498,921 B1  12/2002  Ho et al.

FOREIGN PATENT DOCUMENTS
EP            1079371 A1 *  2/2001
KR         2003-0046494      6/2006
WO            02/31814       4/2002

OTHER PUBLICATIONS

Korean Office Action.

* cited by examiner

*Primary Examiner* — Justin Rider
(74) *Attorney, Agent, or Firm* — Staas & Halsey LLP

(57) ABSTRACT

A speech processing apparatus, medium, and method recognizing speech and responding to the speech. The speech processing apparatus may includes an entity extracting unit which extracts entity information and an upper entity corresponding to the entity information from input speech, a focus determination unit which determines a focus using the extracted entity information requiring a response, a mapping unit which maps lower entity corresponding to the focus with the extracted entity information, and a recognition unit which recognizes a result of arranging the extracted entity information according to semantic association among the lower entities as the input speech. Thus, the speech processing apparatus can accurately recognize grammatically correct speech as well as grammatically incorrect speech and then respond to the speech.

16 Claims, 2 Drawing Sheets

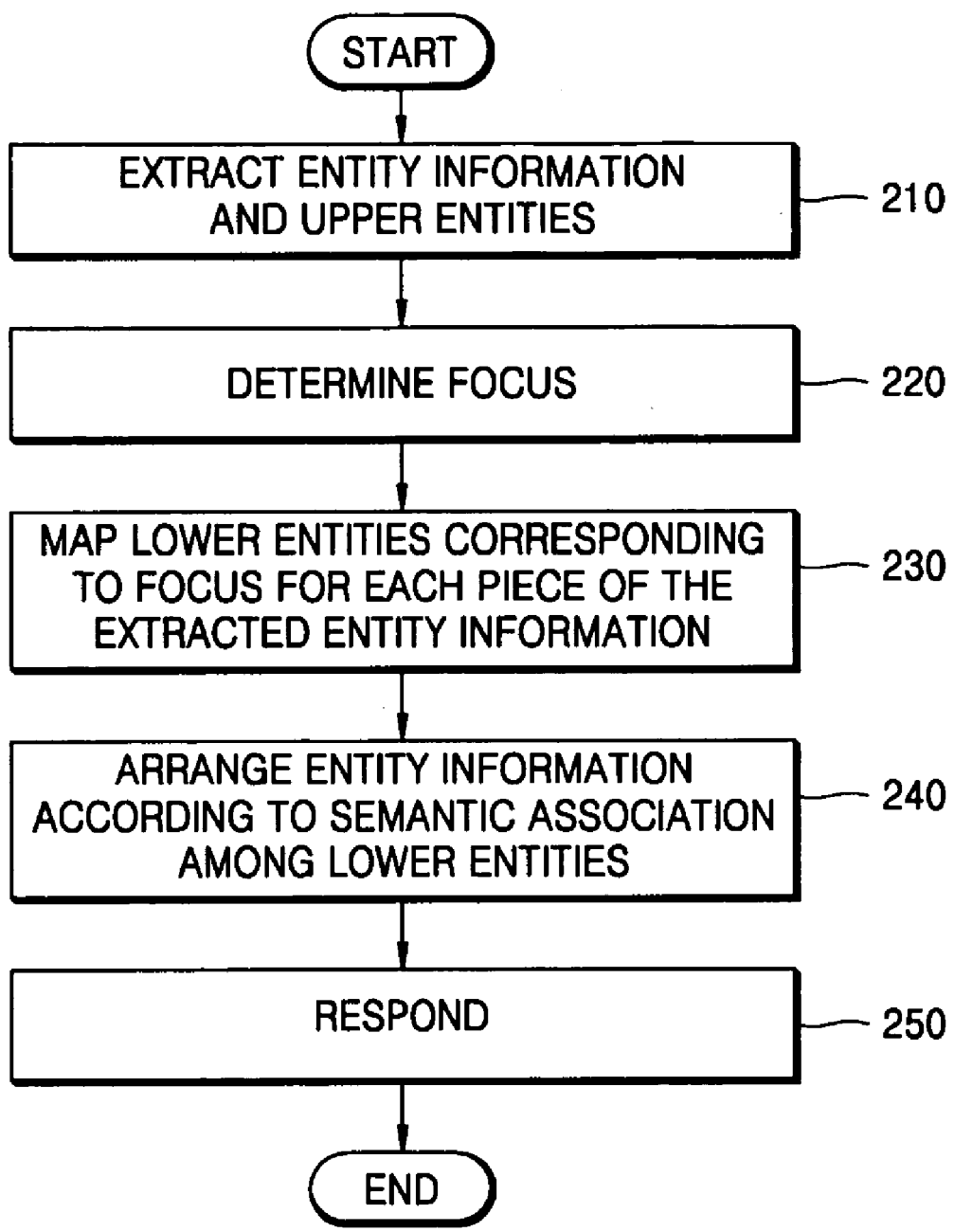

SPEECH PROCESSING APPARATUS, MEDIUM, AND METHOD RECOGNIZING AND RESPONDING TO SPEECH USING ENTITY INFORMATION

CROSS-REFERENCE TO RELATED APPLICATIONS

This application claims the priority benefit of Korean Patent Application No. 10-2005-0025975, filed on Mar. 29, 2005 in the Korean Intellectual Property Office, the disclosure of which is incorporated herein in its entirety by reference.

BACKGROUND OF THE INVENTION

1. Field of the Invention

Embodiments of the present invention, at least as discussed herein, relate to speech processing, and more particularly, to a speech processing apparatus, medium, and method extracting input speech entity information and upper entities from input speech, mappings predetermined lower entities to the extracted input speech entity information, arranging the input speech entity information according to a semantic association among the lower entities, and then recognizing the resultant arrangement as the input speech and responding to the input speech.

2. Description of the Related Art

An example of a conventional speech processing device is discussed in U.S. Pat. No. 5,386,556, entitled "Natural Language Analyzing Apparatus and Method." The natural language analyzing apparatus recognizes input speech using a language database and a grammar database. The natural language analyzing apparatus can only recognize grammatically correct speech. Also, the speech recognition rate of the natural language analyzing apparatus can be increased only by using a larger vocabulary database and grammar database.

Another example of a conventional speech processing device is discussed in U.S. Pat. No. 6,498,921, entitled "Method and System to Answer a Natural-Language Question." The system analyzes speech by receiving additional information from a user if the meaning of the input speech is ambiguous. Thus, the system is inconvenient for the user to use because the user must intervene many times until the input speech is fully processed.

Since conventional speech processing devices recognize input speech based on preset vocabulary and grammar rules and respond to the recognized result, conventional speech processing devices can accurately recognize only grammatically correct speech, and a large amount of vocabulary and grammar rules need to be preset in order to increase the speech recognition rate.

SUMMARY OF THE INVENTION

Embodiments of the present invention include a speech processing apparatus, medium, and method extracting entity information and upper entities from input speech, mapping predetermined lower entities to the extracted entity information, arranging the entity information according to a semantic association among the lower entities, and recognizing the resultant arrangement as the speech and respond to the speech.

To achieve the above and/or other aspects and advantages, embodiments of the present invention include a speech processing apparatus including an entity extracting unit to extract entity information by extracting input speech entity information from input speech and extracting a respective upper entity from a respective same domain as the input speech entity information, a focus determination unit to determine a focus of the input speech using the extracted input speech entity information requiring a response, a mapping unit to map lower domain entities, of the domain, corresponding to the focus with the extracted input speech entity information, and a recognition unit to recognize a result of arranging the extracted input speech entity information according to semantic association among domain entities, of the domain, as the input speech, wherein the upper entity is a hierarchically higher entity, within the domain, than the lower domain entities, the semantic association among domain entities is preset, and entity portions within the extracted input speech entity information are semantically associated with one another.

The extracted input speech entity information may include at least one individual word entity and/or at least one phrase entity.

The apparatus may include a response unit to respond to a recognized request according to the recognized result of the recognition unit. In addition, the method may include a verification unit to compare a degree of relation of the mapped lower domain entities with a preset reference level and to output a verification signal as a result of the comparison, wherein the recognition unit recognizes the input speech in response to the verification signal.

The verification unit examines whether a combination of selected plural lower domain entities are included in one of a preset plurality of combinations and outputs the verification signal as a result of the examination.

The entity extracting unit may read out the input speech entity information and the upper entity from a stored collection of the domain including preset entity information and a plurality of upper entities.

In addition, the focus determination unit may determine the focus using entity information denoting a query or entity information denoting a command among the extracted input speech entity information. Further, the mapping unit may read the lower domain entities to be mapped from a stored collection of the domain including a preset plurality of lower domain entities.

To achieve the above and/or other aspects and advantages, embodiments of the present invention include a method of speech processing, the method including extracting entity information by extracting input speech entity information from input speech and extracting a respective upper entity from a respective same domain as the input speech entity information, determining a focus of the input speech using the extracted input speech entity information that requires a response, mapping lower domain entities, of the domain, corresponding to the focus with the extracted input speech entity information, and recognizing the extracted input speech entity information according to a semantic association among domain entities, in the domain, as the input speech, wherein the upper entity is a hierarchically higher entity, within the domain, than the lower domain entities, the semantic association among domain entities is preset, and entity portions within the extracted input speech entity information are semantically associated with one another.

The extracted input speech entity information may include at least one individual word entity and/or at least one phrase entity.

The method may further include responding to a recognized request according to a result of the recognizing of the extracted input speech entity information.

In addition, the method may include comparing a degree of relation among the mapped lower domain entities with a preset reference level, wherein, in the recognizing of the extracted input speech entity information, the input speech may be recognized if the degree of relation is greater than the reference level. The comparing of the degree of relation may further include determining whether a combination of selected plural lower domain entities form one of a plurality of preset combinations, and in the recognizing of the extracted entity information, the input speech may be recognized if the combination of the selected plurality of lower domain entities form one of the plurality of preset combinations.

In the extracting of the input speech entity information and the upper entity, the input speech entity information and the upper entity may be read from a stored collection of the domain including preset entity information and upper entities.

In the mapping of the lower domain entities, the lower domain entities to be mapped may be read from a stored collection of the domain including a plurality of preset lower domain entities.

To achieve the above and/or other aspects and advantages, embodiments of the present invention include a medium including computer readable code to implement a method of speech processing, the method including extracting entity information by extracting input speech entity information from input speech and extracting a respective upper entity from a respective same domain as the input speech entity information, determining a focus of the input speech using the extracted input speech entity information that requires a response, mapping lower domain entities of the domain corresponding to the focus with the extracted input speech entity information, and recognizing the extracted input speech entity information according to a semantic association among domain entities in the domain, as the input speech, wherein the upper entity is a hierarchically higher entity, within the domain, than the lower domain entities, the semantic association among domain entities is preset, and entity portions within the extracted input speech entity information are semantically associated with one another.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 illustrates a method of speech processing for recognizing and responding to speech, according to an embodiment of the present invention.

DETAILED DESCRIPTION OF THE PREFERRED EMBODIMENTS

Figure 1:
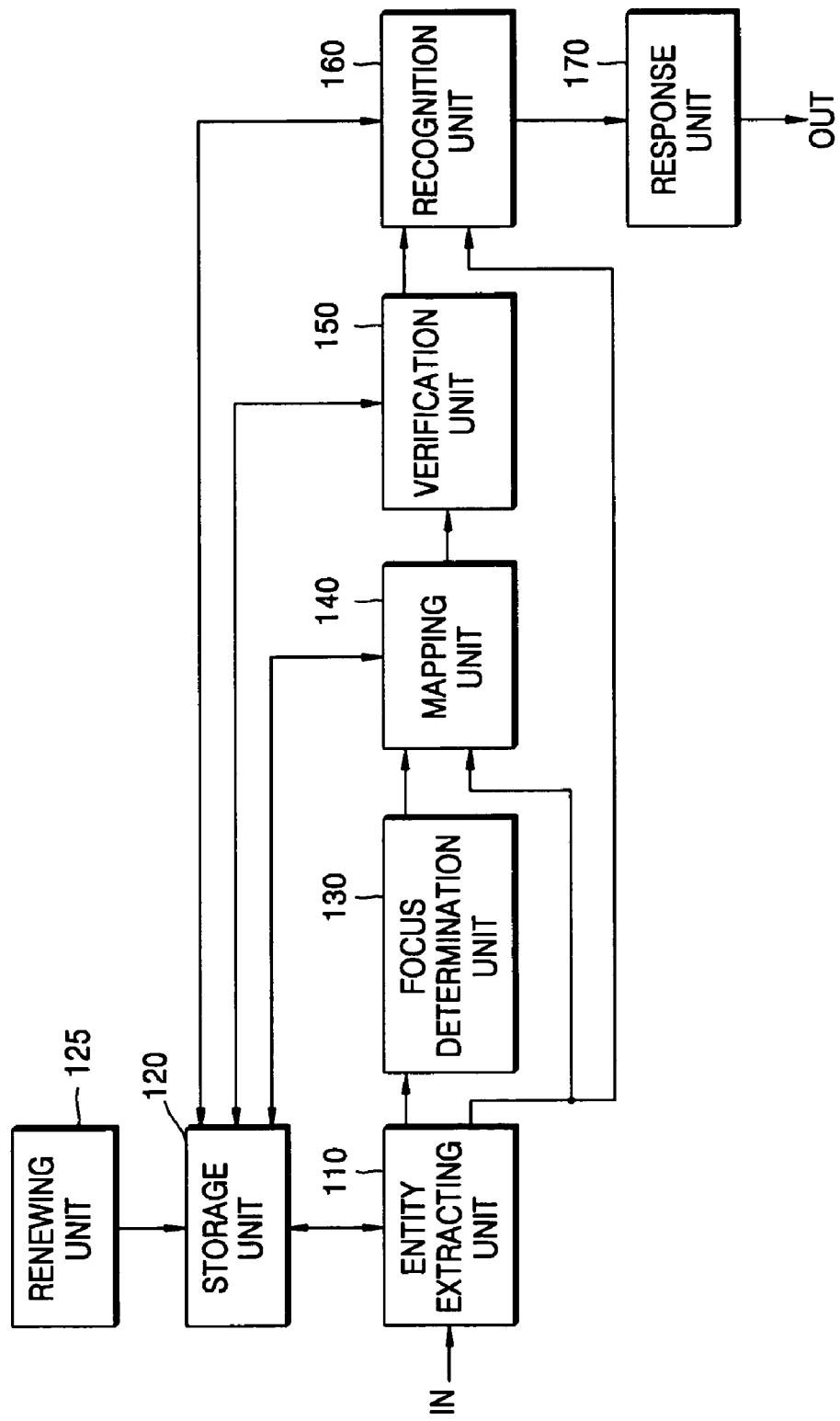
FIG. 1 illustrates a speech processing apparatus for recognizing and responding to speech, according to an embodiment of the present invention.

Reference will now be made in detail to embodiments, at least as discussed herein, of the present invention, examples of which are illustrated in the accompanying drawings, wherein like reference numerals refer to the like elements throughout. Embodiments are described below to explain the present invention by referring to the figures.

FIG. 1 illustrates a speech processing apparatus for recognizing and responding to speech, according to an embodiment of the present invention. The speech processing apparatus may include an entity extracting unit 110, a storage unit 120, a renewing unit 125, a focus determination unit 130, a mapping unit 140, a verification unit 150, a recognition unit 160, and a response unit 170, for example.

The entity extracting unit 110 extracts entity information and more than one upper entity corresponding, i.e., within the same domain or category, to the entity information from input speech IN. The input speech IN may be speech requiring a response. In more detail, the content of the input speech IN may be a query or a command, for example.

For example, assume that the input speech IN is "What time does the drama Haesin starring Su-jong Choi start today." In this example, the input speech IN is a query.

The entity information is detailed information making up the contents of the input speech. Each of the words may be a portion of entity information if the speech is divided into words, whereas each of the phrases may be a portion of entity information if the speech is divided into phrases. Consequently, the speech may be divided into words or phrases.

For example, if the speech is divided into words, the previous example can be divided as follows: "What/time/does/the/drama/Haesin/starring/Su-jong/Choi/start/today." Thus, each of the words can be a portion of the entity information.

However, the entity information can include nouns, verbs, adverbs, and adjectives, in which case, the entity information would include "what," "time," "does," "drama," "Haesin," "starring," "Su-jong Choi," "start," and "today."

Consequently, all of the entity information in the sentence making up the input speech IN is semantically linked to one another, except when the input speech IN is incomprehensible by an ordinary person, but such a situation will not be discussed herein. Therefore, herein, the entity information extracted by the entity extracting unit 110 will be considered comprehensible by an ordinary person and semantically linked.

An entity falls within a category, i.e., logically related domain, of things that can be designated in the real world, with the entity potentially being an individual item in the real world. Such things and items include tangible objects that can be seen as well as intangible objects such as concepts that cannot be seen.

Entities are configured in a hierarchy. The hierarchical semantic system is also known as "ontology." For example, the entity of "today" can be "time," "date," or "air date." That is, the domain including "today" also includes "time," "date," or "air date." In this case, "time" can be a concept higher in the hierarchy than "date" and "air date" and "date" can be a concept higher in the hierarchy than "air date." As such, a predetermined hierarchical relationship exists within the same domain between a plurality of entities. Hereinafter, an entity higher in the hierarchy will be referred to as a "higher entity" or "upper entity" and an entity lower in the hierarchy will be referred to as a "lower entity." For example, here, "time" is a higher entity than "date", and "date" is a higher entity than "air date." Conversely, "air date" is a lower entity than "date."

Consequently, the entity extracting unit 110 extracts entity information "drama," "Haesin," "Su-jong Choi," and "today" and extracts upper entities "program genre," "program name," "person's name," and "time" corresponding to the extracted entity information.

The speech processing apparatus may include the storage unit 120 so that the entity extracting unit 110 can extract the entity information and entities. The storage unit 120 stores entity information and a plurality of entities in a database, e.g., including upper and lower entities. That is, entity information and entities that may be considered may be prepared and stored before input speech recognition.

In this case, the entity extracting unit 110 locates the entity information stored in the storage unit 120 that is identical to the contents of the input speech IN and reads the detected entity information from the storage unit 120. Accordingly, the read entity information is identical to the entity information extracted from the input speech IN.

In addition, the entity extracting unit 110 locates and reads upper entities corresponding to the entity information, e.g., from the storage unit 120. Again, accordingly, the read upper entity will be identical to the extracted upper entity. For example, when entity information "today" is read in the above-described example, the entity extracting unit 110 locates and reads out an upper entity "date."

Meanwhile, a plurality of entities lower than the upper entities can also be stored in advance in the storage unit 120, in addition to the plurality of upper entities. Here, again, the higher or upper entity refers to a hierarchically higher entity than the entity information, with the upper entity and the entity information (as well as the plurality of additional entities, also stored in advance in the storage unit 120) being within the same domain, i.e., within a domain of logically related or similar entities.

The focus determination unit 130 determines a focus of the input speech using entity information having contents that requires a response among the extracted entity information. In the above-described example, the extracting unit 110 can extract entity information "what," "time," "does", "drama," "Haesin," "Su-jong Choi," "start," and "today." The extracted portions of entity information are semantically associated to one another. Thus, "what" denotes "what time is the drama on?"

The semantic association between entity information may be preset. The information regarding the set semantic association and the entity information may further be stored in the storage unit 120, for example.

That is, in the above-described example, the focus determination unit 130 may set "air time" as the focus using the entity information "what," "time," and "start" among the extracted entity information, and may read from the storage unit 120 what kind of semantic association the determined focus has with the entity information "what," "time," "drama," "Haesin," "Su-jong Choi," "start," and "today."

Consequently, the focus determination unit 130 can determine the focus to be "air time" which corresponds to "what time is the drama on?" Meanwhile, the storage unit 120 may also store entity information that requires a response separately from other entity information, for examples. Entity information that requires a response may include "who," "when," and "do," for example.

The mapping unit 140 maps lower entities, corresponding to the extracted upper entities, with the extracted entity information. For example, the upper entity "date" includes various lower entities such as "air date," "concert date," "submission date," etc. Thus, the lower entity related to the focus "what time is the drama on?" may be "air date." To map the lower entities with the extracted entity information, the mapping unit 140 may read lower entities related to the focus among the lower entities stored in the storage unit 120.

A verification unit 150 compares the degree of relation between the mapped lower entities with a preset reference level and generates a verification signal. That is, the verification unit 150 generates the verification signal if the degree of relation is greater than the reference level.

The verification unit 150 may generate the verification signal by detecting whether a combination of the selected lower entities exists in a plurality of preset combinations. The preset combinations may be stored in the storage unit 120, for example.

As another example, if the lower entities mapped by the mapping unit 140 are "air date," "actors," "drama genre," and "title of drama," the verification unit 150 can verify whether the relation between the mapped lower entities are appropriate. For example, if "air date" and "drama name" are selected by a user, a among the mapped lower entities, the verification unit 150 may detect whether a combination including "air date" and "drama name" is included in combinations stored in the storage unit 120. If such a combination exists as the result of detection, the verification unit 150 generates a verification signal. Here, "combination" indicates possible combinations of lower entities.

According to another embodiment of the present invention, combinations may be stored in the storage unit 120, in addition to entities corresponding to the entity information, information on the semantic association among the entity information, the upper entities, and the lower entities.

The recognition unit 160 arranges the entity information extracted by the entity extracting unit 110 according to the semantic relations among the mapped lower entities and recognizes the resultant arrangement as the input speech IN. The semantic relations among the mapped lower entities are preset, and the information on the semantic association among the lower entities may be stored in the storage unit 120. For example, among the lower entities "air date (A)," "actor (B)," and "title of drama (C)," a semantic association of "(C) in which (B) stars is aired on (A)" may be preset, and the information related to this semantic association can be stored in the storage unit 120 in advance. According to an embodiment of the present invention, the recognition unit 160 may operate only when the verification signal generated by the verification unit 150 is input.

The response unit 170 responds to a request in the input speech according to the result recognized by the recognition unit 160. Here, the "request" is indicated by contents of the input speech IN. For example, if the content of the input speech IN includes a query, the response unit 170 performs the answer to the query, noting that the request can refer to alternative requirements, including commands, for example. OUT denotes the performance result of the response unit 170.

The speech processing apparatus may include the renewing unit 125. The renewing unit 125 may renew the contents stored in the storage unit 120, for example. The contents stored in the storage unit 120 include entity information, information on semantic associations among possible entity information, upper entities, lower entities, combinations, and information on semantic associations among possible lower entities. These contents may be periodically or non-periodically stored and/or renewed.

FIG. 2 illustrates a method of processing speech to recognize and respond to speech. The method may include a recognition operation (operations 210 through 240) and a response operation (operation 250).

The entity extracting unit 110 extracts entity information and more than one entity corresponding to the entity information from input speech IN (operation 210), and the focus determination unit 130 determines a focus using the extracted entity information (operation 220).

The mapping unit 140 maps lower entities corresponding to the focus for each of the portions of extracted entity information (operation 230). The recognition unit 160 arranges the extracted entity information according to a semantic association among the mapped lower entities and recognizes the resultant arrangement as the input speech IN (operation 240). The response unit 170 may then respond according to the recognized result (operation 250).

As described above, according to embodiments of the present invention, a speech processing apparatus, medium, and method recognizing and responding to speech can accurately recognize grammatically corrects speech as well as grammatically incorrect speech and then respond to the speech.

Embodiments of the present invention can also be embodied as computer readable code in a medium, e.g., a computer readable recording medium. The medium may be any data storage/transferring device that can store/transfer data which can be thereafter read by a computer system. Examples of such media include read-only memory (ROM), random-access memory (RAM), CD-ROMs, magnetic tapes, floppy disks, and optical data storage devices.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A speech processing apparatus, comprising:
   an entity extracting unit to extract entity information by extracting input speech entity information from input speech and extracting a respective upper entity from a respective same domain as the input speech entity information;
   a focus determination unit to determine a focus of the input speech using extracted input speech entity information requiring a response from among a plurality of the extracted input speech entity information and preset entity information requiring a response, wherein the preset entity information requiring a response is pre-stored separately from other entity information;
   a mapping unit to map lower domain entities, of the domain, corresponding to the focus with the extracted input speech entity information; and
   a recognition unit to recognize a result of arranging the extracted input speech entity information according to semantic association among the mapped lower domain entities, of the domain, as the input speech,
   wherein the upper entity is a hierarchically higher entity, within the domain, than the lower domain entities, the semantic association among the domain entities is preset, and entity portions within the extracted input speech entity information are determined to be semantically associated with one another according to the preset semantic association, and
   wherein the recognition unit performs recognition of the input speech within pre-defined categories, respectively as the lower domain entities, with the lower domain entities being distinguished from the entity portions within the extracted input speech entity information and the recognized input speech.

2. The speech processing apparatus of claim 1, wherein the extracted input speech entity information comprises at least one individual word entity and/or at least one phrase entity.

3. The speech processing apparatus of claim 1, further comprising a response unit to respond to a recognized request according to the recognized result of the recognition unit.

4. The speech processing apparatus of claim 1, further comprising a verification unit to compare a degree of relation of the mapped lower domain entities with a preset reference level and to output a verification signal as a result of the comparison,
   wherein the recognition unit recognizes the input speech in response to the verification signal.

5. The speech processing apparatus of claim 4, wherein the verification unit examines whether a combination of -selected plural lower domain entities, of the lower domain entities, are included in one of a preset plurality of combinations and outputs the verification signal as a result of the examination.

6. The speech processing apparatus of claim 1, wherein the entity extracting unit reads out the input speech entity information and the upper entity from a stored collection of the domain comprising preset entity information and a plurality of upper entities.

7. The speech processing apparatus of claim 1, wherein the entity information requiring the response includes entity information denoting a query or entity information denoting a command among the extracted input speech entity information.

8. The speech processing apparatus of claim 1, wherein the mapping unit reads the lower domain entities to be mapped from a stored collection of the domain comprising a preset plurality of lower domain entities.

9. A method of speech processing, the method comprising:
   extracting entity information by extracting input speech entity information from input speech and extracting a respective upper entity from a respective same domain as the input speech entity information;
   determining a focus of the input speech using extracted input speech entity information that requires a response from among a plurality of the extracted input speech entity information and preset entity information requiring a response, wherein the preset entity information requiring a response is pre-stored separately from other entity information;
   mapping lower domain entities, of the domain, corresponding to the focus with the extracted input speech entity information; and
   recognizing the extracted input speech entity information according to a semantic association among the mapped lower domain entities, in the domain, as the input speech,
   wherein the upper entity is a hierarchically higher entity, within the domain, than the lower domain entities, the semantic association among the domain entities is preset, and entity portions within the extracted input speech entity information are determined to be semantically associated with one another according to the preset semantic association, and
   wherein the recognizing of the extracted input speech entity information includes performing recognition of the input speech within pre-defined categories, respectively as the lower domain entities, with the lower domain entities being distinguished from the entity portions within the extracted input speech entity information and the recognized input speech.

10. The method of claim 9, wherein the extracted input speech entity information comprises at least one individual word entity and/or at least one phrase entity.

11. The method of claim 9, further comprising responding to a recognized request according to a result of the recognizing of the extracted input speech entity information.

12. The method of claim 9, further comprising comparing a degree of relation among the mapped lower domain entities with a preset reference level,
   wherein, in the recognizing of the extracted input speech entity information, the input speech is recognized if the degree of relation is greater than the reference level.

13. The method of claim 12, wherein the comparing of the degree of relation further comprises determining whether a combination of selected plural lower domain entities form one of a plurality of preset combinations, and
   in the recognizing of the extracted entity information, the input speech is recognized if the combination of the selected plurality of lower domain entities, of the lower domain entities, form one of the plurality of preset combinations.

14. The method of claim 9, wherein, in the extracting of the input speech entity information and the upper entity, the input speech entity information and the upper entity are read from a stored collection of the domain comprising preset entity information and upper entities.

15. The method of claim 9, wherein, in the mapping of the lower domain entities, the lower domain entities to be mapped are read from a stored collection of the domain comprising a plurality of preset lower domain entities.

16. At least one computer readable recording medium storing instructions that control at least one processor to perform a method of speech processing, the method comprising:
   extracting entity information by extracting input speech entity information from input speech and extracting a respective upper entity from a respective same domain as the input speech entity information;
   determining a focus of the input speech using extracted input speech entity information that requires a response from among a plurality of the extracted input speech entity information and preset entity information requiring a response, wherein the preset entity information requiring a response is pre-stored separately from other entity information;
   mapping lower domain entities, of the domain, corresponding to the focus with the extracted input speech entity information; and
   recognizing the extracted input speech entity information according to a semantic association among the mapped lower domain entities, in the domain, as the input speech,
   wherein the upper entity is a hierarchically higher entity, within the domain, than the lower domain entities, the semantic association among the domain entities is preset, and entity portions within the extracted input speech entity information are determined to be semantically associated with one another according to the preset semantic association, and
   wherein the recognizing of the extracted input speech entity information includes performing recognition of the input speech within pre-defined categories, respectively as the lower domain entities, with the lower domain entities being distinguished from the entity portions within the extracted input speech entity information and the recognized input speech.

* * * * *

UNITED STATES PATENT AND TRADEMARK OFFICE
CERTIFICATE OF CORRECTION

| | | |
|---|---|---|
| PATENT NO. | : 8,185,397 B2 | Page 1 of 1 |
| APPLICATION NO. | : 11/377207 | |
| DATED | : May 22, 2012 | |
| INVENTOR(S) | : Jaewon Lee et al. | |

It is certified that error appears in the above-identified patent and that said Letters Patent is hereby corrected as shown below:

Column 8, Line 12, In Claim 5, delete "-selected" and insert -- selected, -- therefor.

Signed and Sealed this
Thirty-first Day of July, 2012

David J. Kappos
*Director of the United States Patent and Trademark Office*